United States Patent
Zhuang et al.

(10) Patent No.: US 9,886,195 B2
(45) Date of Patent: Feb. 6, 2018

(54) PERFORMANCE-BASED MIGRATION AMONG DATA STORAGE DEVICES

(71) Applicant: LinkedIn Corporation, Mountain View, CA (US)

(72) Inventors: Zhenyun Zhuang, Belmont, CA (US); Sergiy Zhuk, Saratoga, CA (US); Haricharan K. Ramachandra, Fremont, CA (US); Badrinath K. Sridharan, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 94 days.

(21) Appl. No.: 14/996,101

(22) Filed: Jan. 14, 2016

(65) Prior Publication Data

US 2017/0206015 A1    Jul. 20, 2017

(51) Int. Cl.
*G06F 3/06* (2006.01)

(52) U.S. Cl.
CPC .......... *G06F 3/0605* (2013.01); *G06F 3/0616* (2013.01); *G06F 3/0653* (2013.01); *G06F 3/0685* (2013.01)

(58) Field of Classification Search
CPC ..... G06F 3/0605; G06F 3/0653; G06F 3/0685
See application file for complete search history.

(56) References Cited

U.S. PATENT DOCUMENTS

| | | | |
|---|---|---|---|
| 7,971,093 B1* | 6/2011 | Goel | G06F 11/004 714/6.22 |
| 8,473,566 B1 | 6/2013 | Cardente et al. | |
| 8,935,500 B1 | 1/2015 | Gulati et al. | |
| 2010/0122020 A1* | 5/2010 | Sikdar | G06F 3/061 711/103 |
| 2014/0181398 A1 | 6/2014 | Bhat et al. | |
| 2015/0191183 A1* | 7/2015 | Daum | B61L 15/0081 701/19 |
| 2015/0199148 A1* | 7/2015 | Hrischuk | G06F 3/0653 711/114 |
| 2015/0261438 A1 | 9/2015 | Nagaraj | |
| 2016/0378389 A1* | 12/2016 | Hrischuk | G06F 3/0631 711/154 |
| 2016/0380854 A1* | 12/2016 | Gaddis | H04L 67/1097 709/224 |

FOREIGN PATENT DOCUMENTS

EP    2354919 A2    8/2011

* cited by examiner

*Primary Examiner* — Charles Rones
*Assistant Examiner* — Tian-Pong Chang
(74) *Attorney, Agent, or Firm* — Park, Vaughan, Fleming & Dowler LLP; Chia-Hsin Suen

(57) ABSTRACT

The disclosed embodiments provide a system for analyzing data from a monitored system. During operation, the system identifies a difference between a performance of an application and a service-level agreement (SLA) of the application. Next, the system determines a correlation between the performance of the application and a disk input/output (I/O) performance of a data storage device used by the application. When the correlation exceeds a threshold, the system outputs a recommendation to migrate the application between the data storage device and a different type of data storage device.

19 Claims, 6 Drawing Sheets

PERFORMANCE-BASED MIGRATION AMONG DATA STORAGE DEVICES

BACKGROUND

Field

The disclosed embodiments relate to data storage devices in computer systems. More specifically, the disclosed embodiments relate to performance-based migration among data storage devices.

Related Art

Solid-state drives (SSDs) are associated with significantly higher input/output (I/O) performance than hard disk drives (HDDs). For example, a typical HDD may perform a few hundred I/O operations per second (IOPS), while an SSD may perform hundreds of thousands of TOPS. Similarly, the HDD may have an I/O latency of a few milliseconds, while the I/O latency of the SSD may be on the order of microseconds. Consequently, SSDs are increasingly supplanting HDDs as data storage devices in both consumer and enterprise applications.

On the other hand, the widespread adoption of SSDs may be limited by a higher cost than HDDs and a limited number of write cycles in NAND-based memory cells of SSDs. Hence, use of SSDs may be improved by balancing the performance improvements of the SSDs with the cost- and lifecycle-based limitations of the SSDs.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
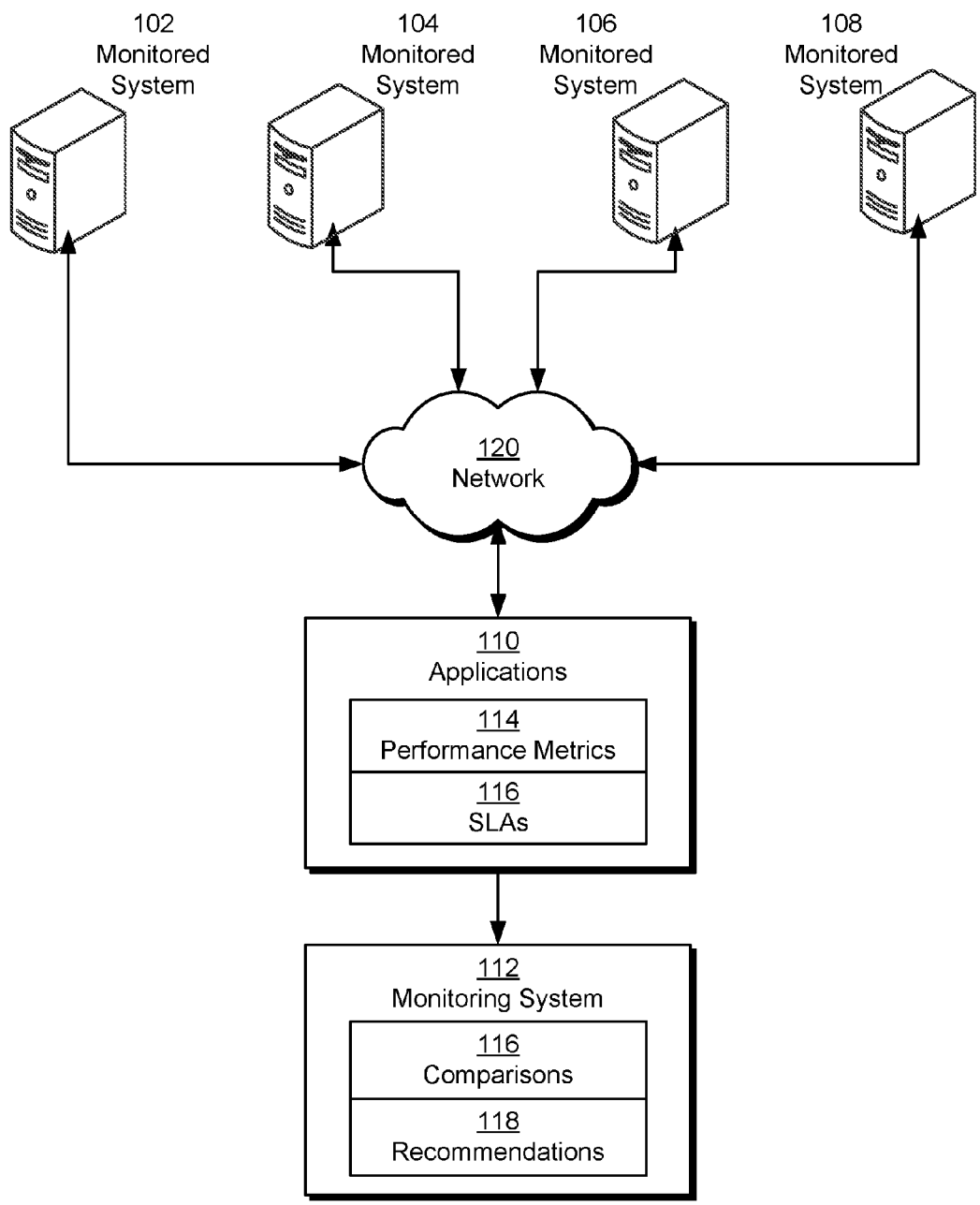
FIG. 1 shows a schematic of a system in accordance with the disclosed embodiments.

The disclosed embodiments provide a method, apparatus, and system for processing data. More specifically, the disclosed embodiments provide a method, apparatus, and system for analyzing performance data collected from a monitored system. As shown in FIG. 1, a monitoring system 112 may monitor one or more performance metrics 114 related to access to one or more applications 110 by a number of monitored systems 102-108. For example, applications 110 may be web applications, mobile applications, native applications, databases, operating systems, and/or other types of software that execute on monitored systems 102-108. In turn, monitored systems 102-108 may be personal computers (PCs), laptop computers, tablet computers, mobile phones, portable media players, workstations, gaming consoles, server computers, and/or other computing devices that are capable of executing applications 110 in one or more forms.

During execution of applications 110, monitored systems 102-108 may provide performance metrics 114 to applications 110 and/or monitoring system 112 for subsequent analysis by monitoring system 112. For example, performance metrics 114 may be collected by applications 110 and/or other components of monitored systems 102-108 and transmitted over network 120 to monitoring system 112. Performance metrics 114 may include measurements related to the performance of applications 110, such as latencies and/or throughputs. Performance metrics 114 may also include measurements related to disk input/output (I/O) performance on monitored systems 102-108, such as I/O operations per second (IOPS), I/O rates, and/or I/O latencies.

Those skilled in the art will appreciate that the performance or distribution of applications 110 on monitored systems 102-108 may be affected by the characteristics of the hardware components in monitored systems 102-108. For example, a portion of applications 110 may be stored on computer systems with hard disk drives (HDDs), while a different portion of applications 110 may be stored on computer systems with solid-state drives (SSDs). While the SSDs may have higher I/O performance than the HDDs, execution of applications 110 from SSDs may be limited by a higher cost for SSDs than for HDDs and a limited write cycle life in memory cells of SSDs.

In one or more embodiments, performance metrics 114 are used by monitoring system 112 to manage the migration of applications 110 among HDDs, SSDs, and/or other types of data storage devices. As described in further detail below, monitoring system 112 may aggregate the transmitted performance metrics 114 from applications 110 and/or monitored systems 102-108. Next, monitoring system 112 may generate a number of comparisons 116 using the performance metrics to assess the effect of disk I/O performance in monitored systems 102-108 on the performance of applications 110. Monitoring system 112 may then use comparisons 116 to output one or more recommendations 118 related to migrating a subset of the applications among different types of data storage devices in monitored systems 102-108. Consequently, monitoring system 112 may enable performance-based migration of applications 110 among the data storage devices, which in turn may facilitate the efficient utilization of the data storage devices by the applications.

Figure 2:
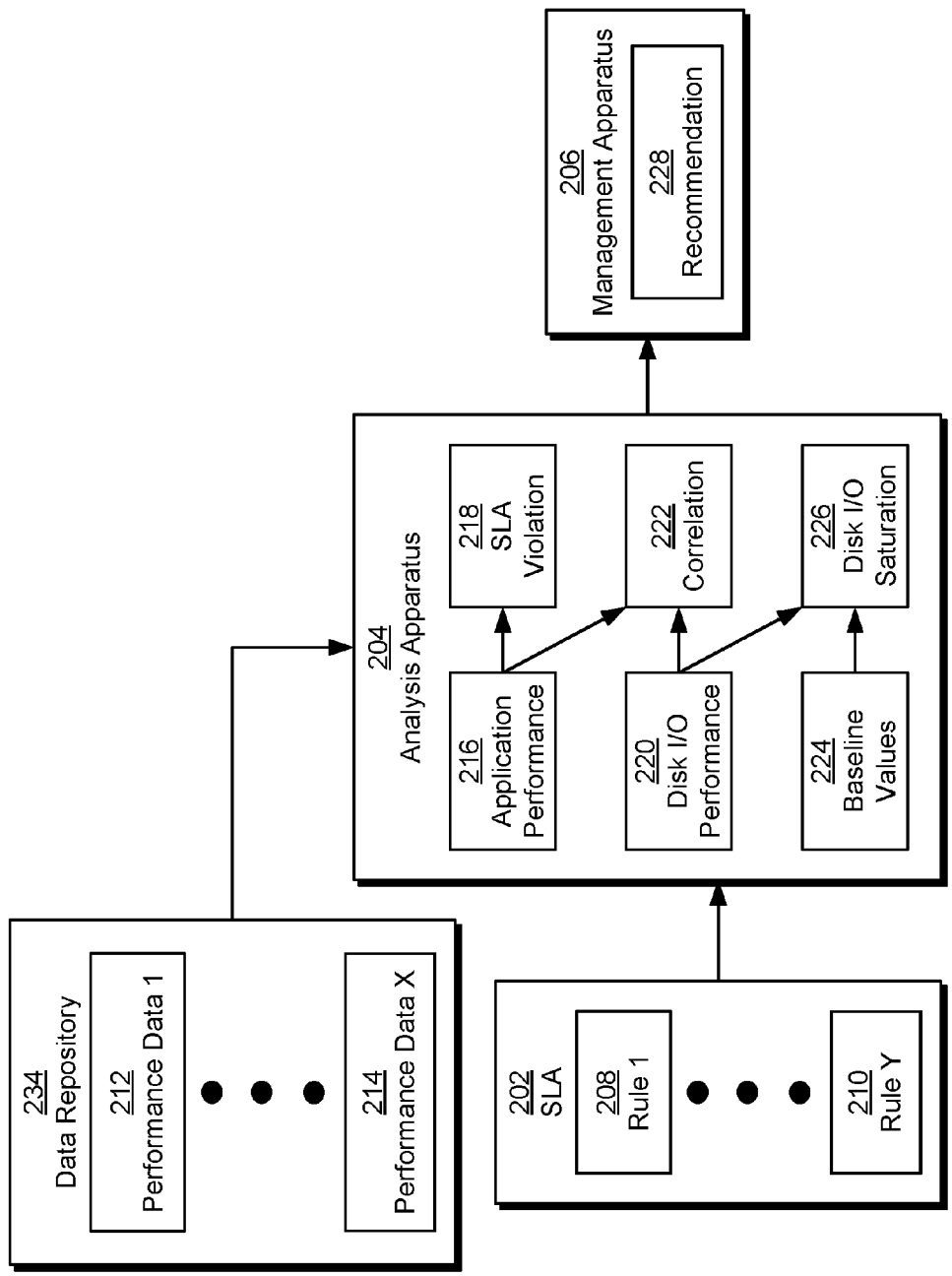
FIG. 2 shows a system for analyzing performance data from an application in accordance with the disclosed embodiments.

FIG. 2 shows a system for analyzing performance data from an application in accordance with the disclosed embodiments. More specifically, FIG. 2 shows a monitoring system, such as monitoring system 112 of FIG. 1, that collects and analyzes performance metrics from a number of monitored systems. As shown in FIG. 2, the monitoring system includes an analysis apparatus 204 and a management apparatus 206. Each of these components is described in further detail below.

Analysis apparatus 204 may obtain performance data (e.g., performance data 1 212, performance data x 214) associated with an application (e.g., applications 110 of FIG. 1) and/or one or more monitored systems (e.g., monitored systems 102-108 of FIG. 1) on which the application executes. For example, analysis apparatus 204 may obtain time-series measurements of application response latency and/or application throughput as performance metrics of the application (e.g., performance metrics 114 of FIG. 1). Analysis apparatus 204 may also obtain time-series measurements of IOPS, I/O latency, and/or I/O rate as disk I/O metrics representing the disk I/O performance of data storage devices used by the application.

The performance data may be collected by the applications, monitored systems, and/or a monitoring infrastructure associated with the applications or monitored systems. The performance data may also be aggregated into a data repository 234 such as a relational database, distributed filesystem, and/or other storage mechanism for subsequent retrieval and use. For example, time-series measurements of application and disk I/O performance may be averaged at a 10-second granularity to accommodate mismatches among timestamps in different sets of measurements. The averaged values and corresponding time intervals may then be stored in data repository 234. Some or all of the performance data and/or aggregated data may also be transmitted directly to analysis apparatus 204 and/or another component of the system for real-time or near-real-time analysis by the component.

Analysis apparatus 204 may also obtain a service level agreement (SLA) 202 for the application. SLA 202 may contain a number of rules (e.g., rule 1 208, rule y 210) related to the expected performance of the application. Each rule may be specified in terms of application response latency, application throughput, and/or another performance metric associated with the application. For example, SLA 202 may contain a rule that establishes a maximum application response latency of 20 ms for the application. In another example, rules in SLA 202 may be specified in a series of pairs, with each pair containing a percentile and a corresponding latency in ms. Thus, a pair expressed as <99%, 15> may indicate that the $99^{th}$ percentile of the distribution of the application's response latency should not exceed 15 ms.

Moreover, some or all of the input to analysis apparatus 204 may be provided by a user. For example, the user may upload and/or manually enter values for application performance metrics, disk 110 metrics, and/or SLA 202, and analysis apparatus 204 may analyze the entered data in an "offline" mode instead of an "online" mode that processes performance data from data repository 234 and/or as the performance data is received.

Next, analysis apparatus 204 may perform a number of comparisons (e.g., comparisons 116 of FIG. 1) using the performance data and SLA 202 to assess the suitability of the application for migration from one type of data storage device to another. For example, analysis apparatus 204 may determine if the current performance of the application, which may or may not conform to SLA 202, is likely to benefit from migrating from a lower-performance data storage device such as an HDD to a higher-performance data storage device such as an SSD.

As shown in FIG. 2, analysis apparatus 204 may compare an application performance 216 of the application with SLA 202 to identify an SLA violation 218 in the application. For example, analysis apparatus 204 may obtain or calculate percentile values of application performance 216 from time-series measurements of application response latency or throughput and/or a distribution of the application response latency or throughput. If any of the percentile values violate the corresponding rule in SLA 202 for a pre-specified period (e.g., a number of seconds), SLA violation 218 may be identified, and the time period(s) during which the SLA is violated may be marked. If application performance 216 is determined to not violate SLA 202, the application may be omitted as a candidate for migration among data storage devices.

Analysis apparatus 204 may also determine a correlation 222 between application performance 216 and a disk I/O performance 220 of the data storage device used by the application. Disk I/O performance 220 may be represented by disk I/O metrics in data repository 234, such as values of TOPS, I/O latency (e.g., time between receipt and completion of a disk I/O request), and/or I/O rate (e.g., amount of data read from or written to disk per second) from the data storage device. To ensure that disk I/O performance 220 is a direct result of execution of the application, the disk I/O metrics may be collected and/or filtered to reflect the times at which the data storage device is used only to process I/O requests from the application and not from other applications.

Correlation 222 may be assessed between each type of application performance 216 metric (e.g., application response latency, application throughput, etc.) and each type of disk I/O metric available to analysis apparatus 204, or correlation 222 may be assessed between a smaller number of application performance metrics and/or disk I/O metrics. In addition, correlation 222 may be calculated as a rank correlation between sets of metrics in application performance 216 and disk I/O performance 220. For example, application performance 216 may be obtained as a set of aggregated time-series measurements of application response latency, and disk I/O performance 220 may be obtained as three sets of aggregated time-series measurements of TOPS, I/O rate, and I/O latency. Metrics related to disk I/O performance 220 may also be normalized using a decay function so that the metrics increase as disk I/O performance 220 decreases to match the application response latency, which increases as application performance 216 drops. Correlation 222 may then be calculated between each set of disk I/O metrics and the application response latencies as a Spearman's rank correlation coefficient, Kendall rank correlation coefficient, and/or another correlation coefficient that is based on the rank of corresponding time-series values in measurements of application performance 216 and disk I/O performance 220.

Each value of correlation 222 may then be compared with a threshold to determine if the correlation is significantly positive. For example, three values of correlation 222 between application response latency and TOPS, application response latency and I/O rate, and application response latency and I/O throughput may be compared with a threshold of 0.5. If any of the values exceed the threshold, a significantly positive correlation 222 between application performance 216 and disk I/O performance 220 may be found. Because correlation 222 is assessed for multiple pairs of metrics, analysis apparatus 204 may better characterize the relationship between application performance 216 and disk I/O performance 220 than if correlation 222 were calculated for only one application performance metric and one disk I/O metric.

Analysis apparatus 204 may additionally compare disk I/O performance 220 with a set of baseline values 224 to identify a disk I/O saturation 226 during execution of the application and/or times at which SLA violation 218 is found. Baseline values 224 may be values of TOPS, I/O rate, I/O latency, and/or other disk I/O metrics that represent saturation of the corresponding data storage device. To calculate baseline values 224, analysis apparatus 204 and/or another component of the system may determine maximum values of the corresponding disk I/O metrics and scale the maximum values by a factor. For example, the component may execute benchmark workloads that vary I/O characteristics (e.g., 110 sizes, random/sequential access, read/write ratios, etc.) on the data storage device to obtain the maximum values of the disk I/O metrics from the data storage device. The component may then divide the maximum values by a factor of 2 or 3 to obtain baseline values that reflect disk I/O saturation 226 during the processing of actual workloads.

If any or all disk I/O metrics exceed the corresponding baseline values 224, disk I/O saturation 226 may be found in the data storage device. Conversely, if none of the metrics associated with disk I/O performance 220 exceed the corresponding baseline values 224, disk I/O saturation 226 may be absent from the data storage device. As with calculation of correlation 222, the use of multiple disk I/O metrics to assess disk I/O saturation 226 may improve the characterization of disk I/O behavior in the data storage device.

When an SLA violation 218, a significantly positive correlation 222 between application performance 216 and disk I/O performance 220, and disk I/O saturation 226 are found in the same application, the application may be deemed a candidate for migration from a lower-performance data storage device (e.g., an HDD) to a higher-performance data storage device (e.g., an SSD). Moreover, some or all conditions associated with comparisons by analysis apparatus 204 may be required to overlap in time. For example, disk I/O saturation 226 may be required to co-occur with SLA violation 218 to establish a potential performance benefit of migrating the application to a higher-performance data storage device.

If the application is a candidate for migrating between data storage devices, management apparatus 206 may output a recommendation 228 to migrate the application between the two types of data storage devices. For example, management apparatus 206 may generate an alert, open a ticket, and/or transmit an email to notify an entity associated with the application (e.g., the owner) that the application should be moved from an HDD to an SSD. Management apparatus 206 may also output disk I/O metrics, application performance metrics, correlation 222, and/or other values used to characterize the application's performance and/or disk I/O usage with recommendation 228 to further guide decisions related to the resources on which the application executes.

Management apparatus 206 may also output other types of recommendations and/or notifications based on comparisons by analysis apparatus 204. For example, management apparatus 206 may recommend reducing I/O in the application if migrating to a higher-performance data storage device is not an option. In another example, analysis apparatus 204 may identify SLA violation 218 but fail to find a substantially positive correlation 222 and/or disk I/O saturation 226. To facilitate subsequent root cause analysis and remediation of the issues, management apparatus 206 may output a notification indicating that performance issues with the application are not caused by disk I/O.

By comparing application performance 216, SLA 202, disk I/O performance 220, and baseline values 224, the system of FIG. 2 may selectively identify applications that are likely to benefit from higher-performance data storage devices such as SSDs without requiring trial deployments of the applications on the data storage devices and/or manual analysis of the performance data. In turn, the system of FIG. 2 may scale with the number of applications and/or number of data storage devices used by the applications, thereby improving the performance of the applications and the effective utilization of the data storage devices by the applications.

Those skilled in the art will appreciate that the system of FIG. 2 may be implemented in a variety of ways. First, data repository 234, analysis apparatus 204, and management apparatus 206 may be provided by a single physical machine, multiple computer systems, one or more virtual machines, a grid, one or more databases, one or more filesystems, and/or a cloud computing system. Analysis apparatus 204 and management apparatus 206 may additionally be implemented together and/or separately by one or more hardware and/or software components and/or layers.

Second, the functionality of analysis apparatus 204 and management apparatus 206 may be used to manage the migration of applications 228 among other types of data storage devices and/or other hardware components. For example, the system of FIG. 2 may be used to identify applications that are candidates for migration from SSDs to HDDs in instances when the applications' SLAs are relaxed, the I/O performance of HDDs is increased, and/or the I/O requirements of the applications have decreased. An application may thus be recommended for migration from an SSD to an HDD if the application's SLA is not violated, the application's performance does not positively correlate with disk I/O performance, and/or the application's I/O usage can be accommodated by the HDD.

Third, the identification of applications as candidates for migrating among data storage devices may be based on additional, non-performance-related criteria. For example, the cost of each type of data storage device, expected life of the data storage device, workload of the application, and/or other characteristics of the application and data storage devices may be incorporated into the comparisons performed by analysis apparatus 204. To account for the additional characteristics during the assessment of the application as a candidate for migration, thresholds associated with correlation 222 and/or baseline values 224 may be tuned, or additional comparisons based on the characteristics may be performed by analysis apparatus 204. For example, the threshold used to establish a significantly positive correlation 222 between application performance 216 and disk I/O performance 220 may be increased if the price difference between HDDs and SSDs rises and decreased if the price difference falls. In a second example, analysis apparatus 204 may remove the application as a candidate for migrating to an SSD with a limited number of write cycles if the write workload of the application frequently or consistently exceeds a threshold.

Figure 3:
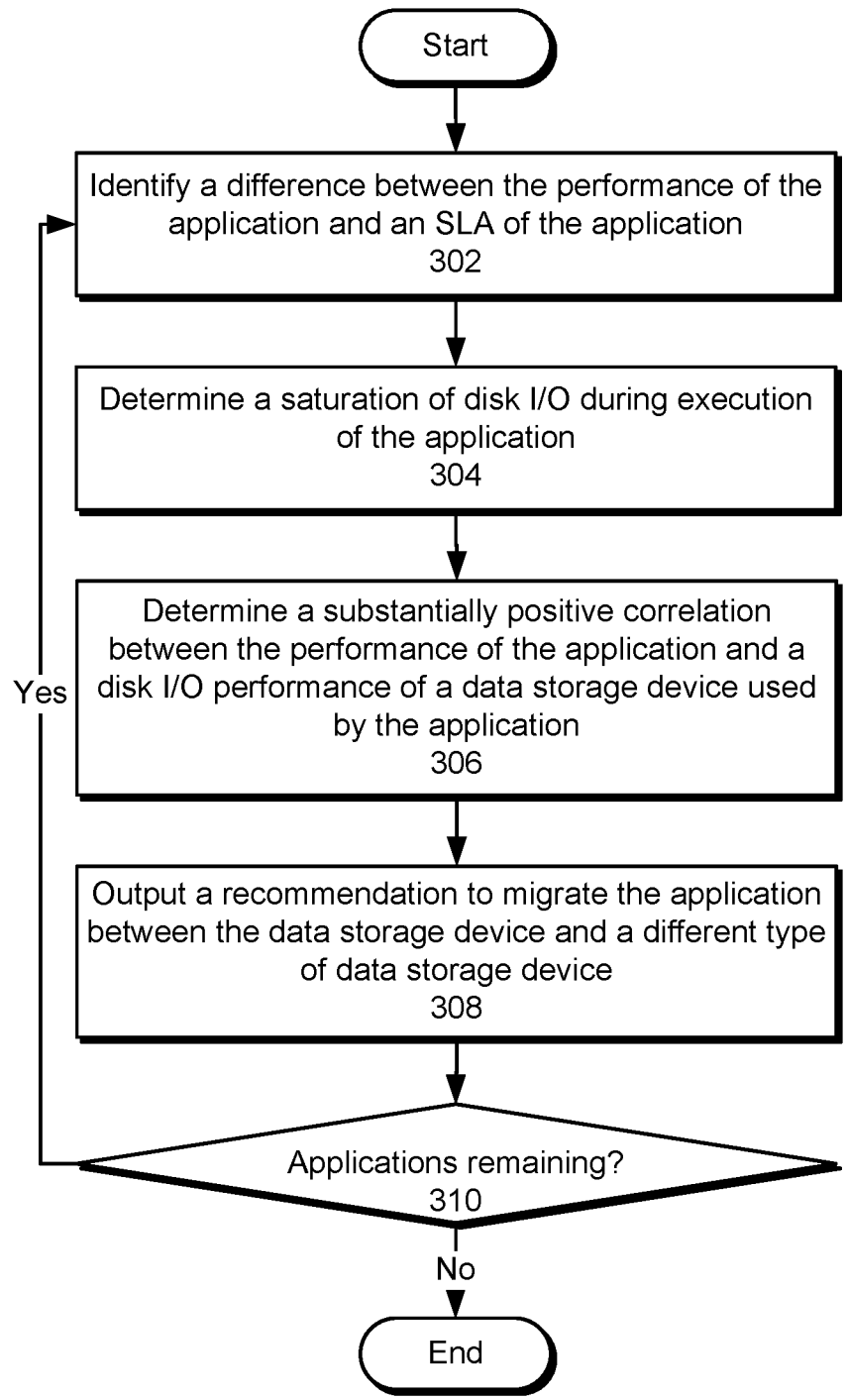
FIG. 3 shows a flowchart illustrating the process of analyzing performance data from an application in accordance with the disclosed embodiments.

FIG. 3 shows a flowchart illustrating the process of analyzing performance data from an application in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a difference between the performance of the application and an SLA of the application is identified (operation 302). For example, the difference may be identified as an SLA violation when the application's response latency exceeds the corresponding latency in the SLA for a pre-specified period. Next, a saturation of disk I/O during execution of the application is determined (operation 304), as described in further detail below with respect to FIG. 4. A substantially positive correlation between the performance of the application and a disk I/O performance of a data storage device used by the application is also determined (operation 306), as described in further detail below with respect to FIG. 5.

When the conditions in operations 302-306 are satisfied, a recommendation to migrate the application between the data storage device and a different type of data storage device is outputted (operation 308). For example, a notification may be generated to recommend the migration of the application from a lower-performance data storage device such as an HDD to a higher-performance data storage device such as an SSD. Conversely, if any of the conditions is not satisfied, the recommendation is not made.

Analysis of performance data in operations 302-308 may be repeated for remaining applications (operation 310) in a set of applications. For example, each application may be deployed within an organization, data center, and/or other collection of resources. As a result, the applications may continually, periodically, or selectively be assessed as candidates for migrating between the two types of data storage devices to improve the performance of the applications and/or the efficient utilization of the data storage devices.

Figure 4:
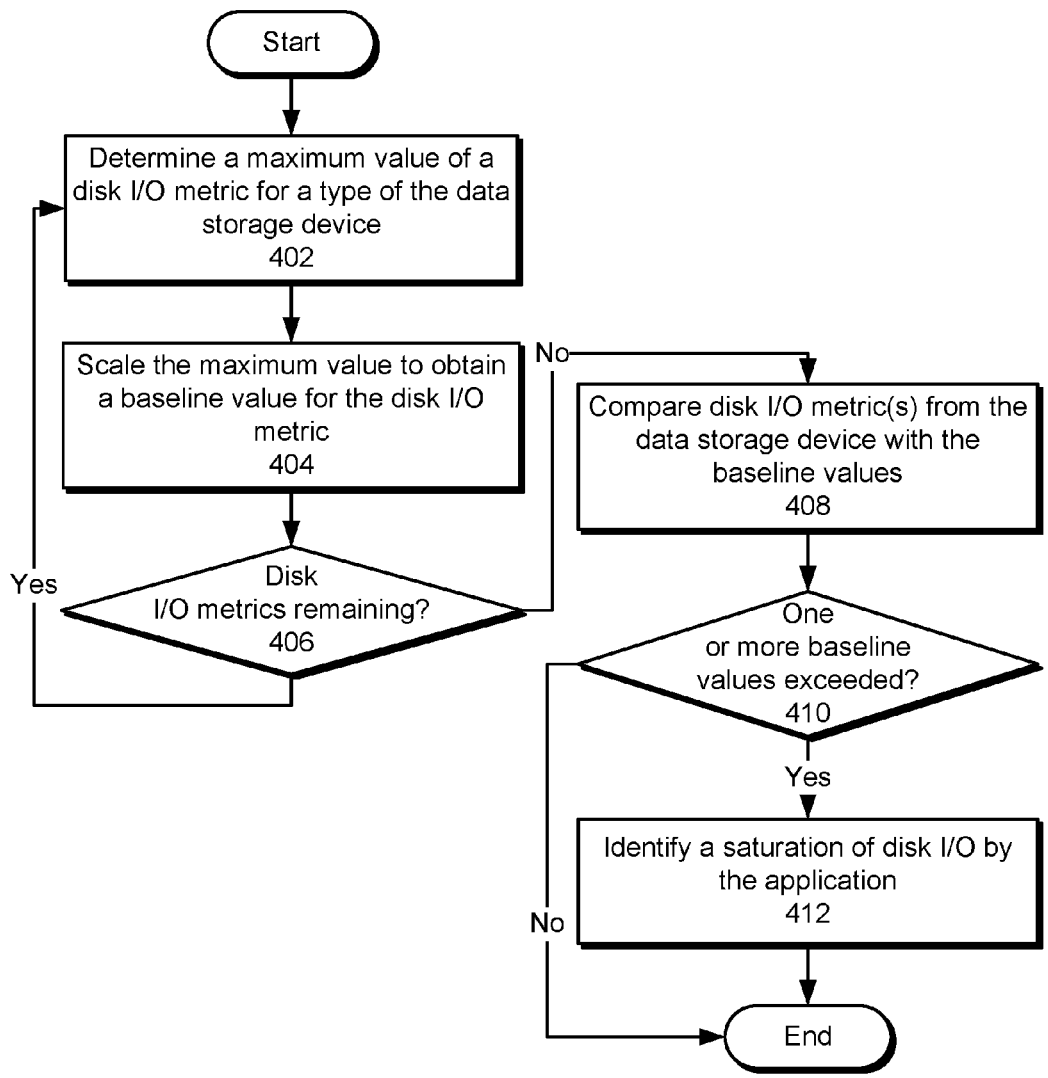
FIG. 4 shows a flowchart illustrating the process of determining a saturation of disk I/O by an application using a data storage device in accordance with the disclosed embodiments.

FIG. 4 shows a flowchart illustrating the process of determining a saturation of disk I/O by an application using a data storage device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

First, a maximum value of a disk I/O metric for a type of the data storage device is determined (operation 402). In the illustrated process, the disk I/O metric may be an TOPS, an I/O rate, and/or an I/O throughput. The maximum value may be determined by measuring the disk I/O metric during processing of a benchmark workload on the type of data storage device. Next, the maximum value is scaled to obtain a baseline value for the disk I/O metric (operation 404). For example, the maximum value may be divided by a numeric factor to obtain a baseline value that represents saturation of disk I/O during processing of normal workloads on the data storage device. Operations 402-404 may be repeated for additional disk I/O metrics (operation 406). For example, the maximum and baseline values may be obtained for the TOPS, I/O rate, and I/O throughput of one or more types of data storage devices.

The disk I/O metrics from the data storage device are then compared with the baseline values (operation 408) to determine if one or more baseline values are exceeded (operation 410) by the disk I/O metrics. The comparison may be restricted to disk I/O metrics from time intervals during which the SLA of the application is violated. If no baseline values are exceeded, the saturation of disk I/O by the application is not found. If one or more baseline values are exceeded, the saturation of disk I/O by the application is identified (operation 412).

Figure 5:
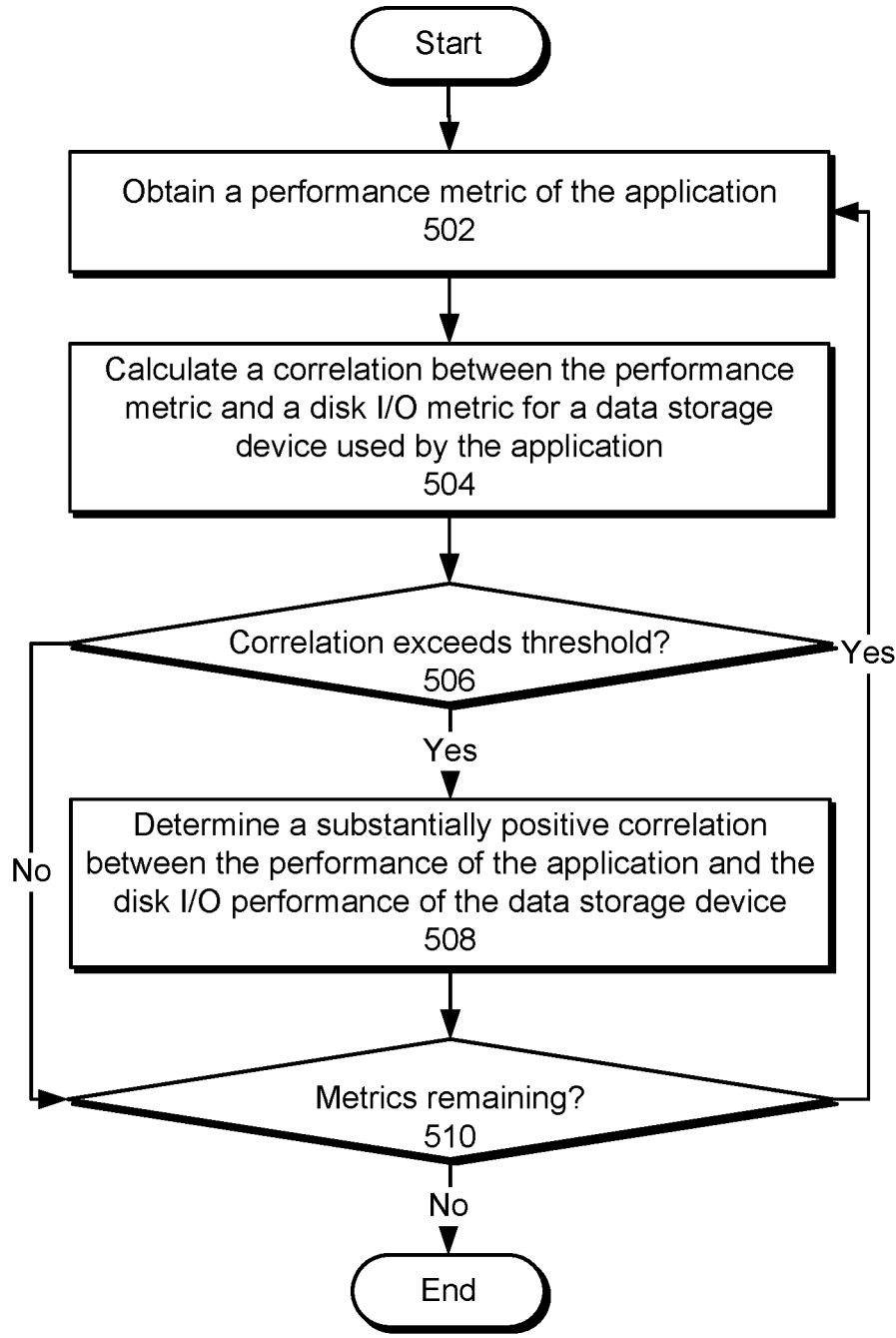
FIG. 5 shows a flowchart illustrating the process of determining a substantially positive correlation between a performance of an application and a disk input/output (I/O) performance of a data storage device during execution of the application on the data storage device.

FIG. 5 shows a flowchart illustrating the process of determining a correlation between a performance of an application and a disk input/output (I/O) performance of a data storage device during execution of the application on the data storage device. In one or more embodiments, one or more of the steps may be omitted, repeated, and/or performed in a different order. Accordingly, the specific arrangement of steps shown in FIG. 5 should not be construed as limiting the scope of the technique.

First, a performance metric of the application is obtained (operation 502), such as a throughput or latency of the application. Next, a correlation between the performance metric and a disk I/O metric for a data storage device used by the application is calculated (operation 504). For example, the correlation may be calculated as a rank correlation between two sets of time-series data representing the performance metric and the disk I/O metric.

The correlation may exceed a threshold (operation 506) representing a substantially positive correlation between the two sets of metrics. If the threshold is exceeded, the substantially positive correlation between the performance of the application and the disk I/O performance of the data storage device may be determined (operation 508). If the threshold is not exceeded, a substantially positive correlation is not found.

Operations 502-508 may be repeated for remaining metrics (operation 510) associated with the performance of the application and/or the disk I/O performance of the data storage device. For example, a correlation between each pair of application performance and disk I/O metrics may be calculated and compared with the corresponding threshold to determine the presence or absence of a substantially positive correlation between the two metrics. If the correlation exceeds the threshold for any pair of metrics, a substantially positive correlation between application performance and disk I/O performance may be found.

Figure 6:
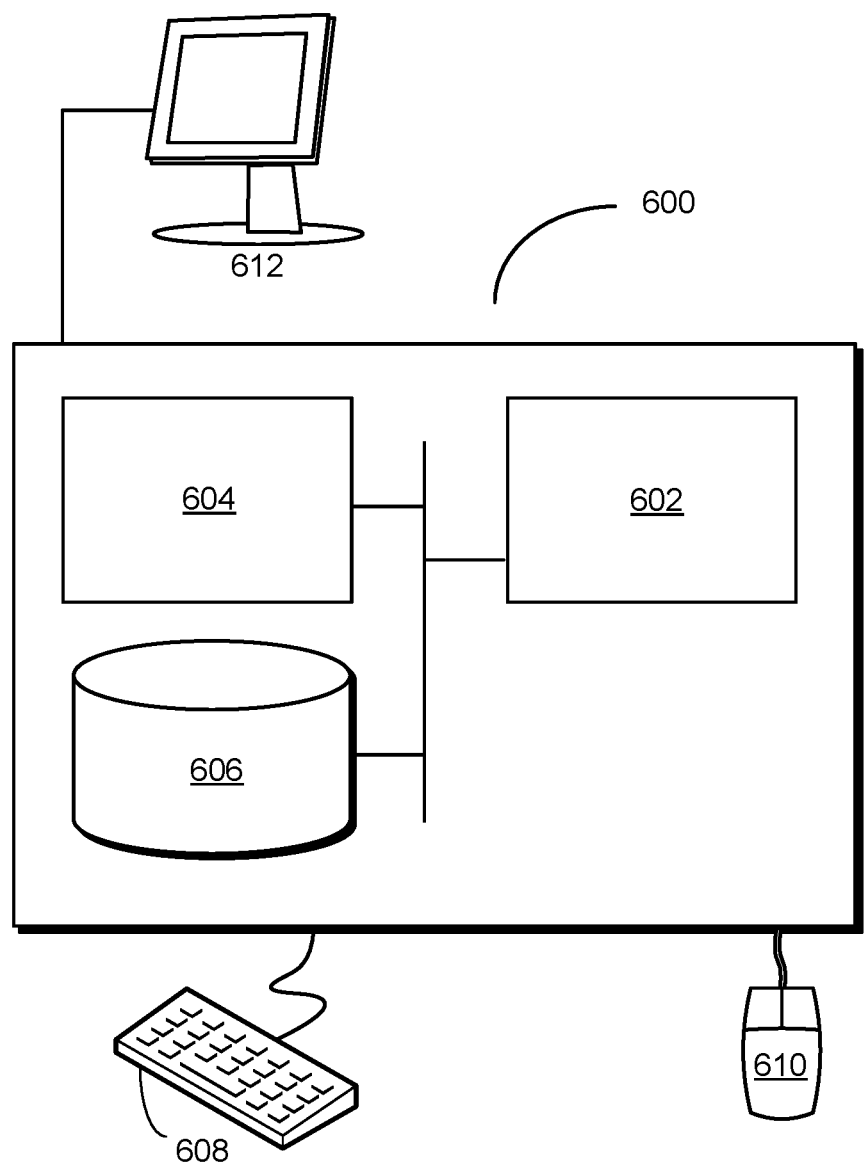
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for analyzing data from a monitored system. The system may include an analysis apparatus and a management apparatus. The analysis apparatus may identify a difference between a performance of an application operating on the monitored system and an SLA of the application. Next, the analysis apparatus may determine a saturation of disk I/O by the application and a correlation between the performance of the application and a disk I/O performance of a data storage device used by the application. When the correlation exceeds a threshold, the management apparatus may output a recommendation to migrate the application between the data storage device and a different type of data storage device.

In addition, one or more components of computer system 600 may be remotely located and connected to the other components over a network. Portions of the present embodiments (e.g., analysis apparatus, management apparatus, data repository, applications, monitored systems, etc.) may also be located on different nodes of a distributed system that implements the embodiments. For example, the present embodiments may be implemented using a cloud computing system that monitors applications executing on a set of remote systems and generates recommendations to migrate a subset of the applications among data storage devices in the remote systems.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   identifying, by a computer system, a difference between one or more performance metrics of an application and a service-level agreement (SLA) of the application;
   calculating, by the computer system, a numeric correlation between the one or more application performance metrics and one or more disk input/output (I/O) metrics representing the disk I/O performance of a data storage device used by the application;
   comparing the numeric correlation to a threshold value;
   determining a saturation of disk I/O by the application;
   determining that an SLA violation occurred based on the identified difference, the saturation of disk I/O by the application, and the numeric correlation exceeding the threshold value; and
   outputting a recommendation to migrate the application from the data storage device to a different type of data storage device.

2. The method of claim 1, wherein determining the saturation of disk I/O by the application comprises:
   comparing the one or more disk I/O metrics with baseline values for the one or more disk I/O metrics on the data storage device; and
   identifying the saturation of disk I/O when a disk I/O metric in the one or more disk I/O metrics exceeds a corresponding baseline value.

3. The method of claim 2, wherein determining the saturation of disk I/O by the application further comprises:
   for each disk I/O metric in the one or more disk I/O metrics:
   determining a maximum value of the disk I/O metric; and
   scaling the maximum value to obtain a baseline value for the disk I/O metric prior to comparing the disk I/O metric with the baseline value.

4. The method of claim 1, wherein the correlation comprises a rank correlation.

5. The method of claim 1, wherein the one or more performance metrics comprises at least one of:
   a latency; and
   a throughput.

6. The method of claim 2, wherein the one or more disk I/O metrics comprise an I/O operations per second (IOPS).

7. The method of claim 2, wherein the one or more disk I/O metrics comprise an I/O rate.

8. The method of claim 2, wherein the one or more disk I/O metrics comprise an I/O latency.

9. The method of claim 1, wherein the data storage device comprises a hard disk drive (HDD) and the different type of data storage device comprises a solid-state drive (SSD).

10. The method of claim 1, wherein identifying the difference between the performance of the application and the SLA of the application comprises:
    identifying a violation of the SLA by the application over a pre-specified period.

11. The method of claim 2, wherein determining the saturation of disk I/O by the application further comprises calculating the baseline values for the one or more disk I/O metrics on the data storage device by, for each of the one or more disk I/O metrics:
    identifying a maximum value for the disk I/O metric during processing of a benchmark workload; and
    dividing the maximum value by a numeric factor to obtain a value representing saturation of disk I/O processing of normal workloads on the data storage device;
    wherein the baseline value for the disk I/O metric comprises the obtained value.

12. An apparatus, comprising:
    one or more processors; and
    memory storing instructions that, when executed by the one or more processors, cause the apparatus to:
    identify a difference between one or more performance metrics of an application and a service-level agreement (SLA) of the application;
    calculate a numeric correlation between the one or more application performance metrics and one or more disk input/output (I/O) metrics representing the disk I/O performance of a data storage device used by the application;
    compare the numeric correlation to a threshold value;
    determine a saturation of disk I/O by the application;
    determine that an SLA violation occurred based on the identified difference, the saturation of disk I/O by the application, and the numeric correlation exceeding the threshold value; and
    output a recommendation to migrate the application from the data storage device to a different type of data storage device.

13. The apparatus of claim 12, wherein determining the saturation of disk I/O by the application comprises:

comparing the one or more disk I/O metrics with baseline values for the one or more disk I/O metrics on the first type of data storage device; and identifying the saturation of disk I/O when a disk I/O metric in the one or more disk I/O metrics exceeds a corresponding baseline value.

14. The apparatus of claim 13, wherein the one or more disk I/O metrics comprise at least one of:

an I/O operations per second (IOPS);
an I/O rate; and
an I/O latency.

15. The apparatus of claim 14, wherein the one or more performance metrics comprises at least one of:

a latency; and
a throughput.

16. The apparatus of claim 13, wherein determining the saturation of disk I/O by the application further comprises calculating the baseline values for the one or more disk I/O metrics on the data storage device by, for each of the one or more disk I/O metrics:

identifying a maximum value for the disk I/O metric during processing of a benchmark workload; and dividing the maximum value by a numeric factor to obtain a value representing saturation of disk I/O processing of normal workloads on the data storage device;

wherein the baseline value for the disk I/O metric comprises the obtained value.

17. A system, comprising:

an analysis module comprising a non-transitory computer-readable medium comprising instructions that, when executed, cause the system to:

identify a difference between one or more performance metrics of an application and a service-level agreement (SLA) of the application;

calculate a numeric correlation between the one or more application performance metrics and one or more disk input/output (I/O) metrics representing the disk I/O performance of a data storage device used by the application;

compare the numeric correlation to a threshold value;

determine a saturation of disk I/O by the application;

determine that an SLA violation occurred based on the identified difference, the saturation of disk I/O by the application, and the numeric correlation exceeding the threshold value; and a management module comprising a non-transitory computer-readable medium comprising instructions that, when executed, cause the system to output a recommendation to migrate the application from the data storage device to a different type of data storage device when the correlation exceeds a threshold.

18. The system of claim 17, wherein determining the saturation of disk I/O by the application comprises:

comparing the one or more disk I/O metrics with baseline values for the one or more disk I/O metrics on the data storage device; and identifying the saturation of disk I/O when a disk I/O metric in the one or more disk I/O metrics exceeds a corresponding baseline value.

19. The system of claim 18, wherein determining the saturation of disk I/O by the application further comprises calculating the baseline values for the one or more disk I/O metrics on the data storage device by, for each of the one or more disk I/O metrics:

identifying a maximum value for the disk I/O metric during processing of a benchmark workload; and dividing the maximum value by a numeric factor to obtain a value representing saturation of disk I/O processing of normal workloads on the data storage device;

wherein the baseline value for the disk I/O metric comprises the obtained value.

* * * * *